2,936,267

PROCESS FOR PURIFYING CARBOXYLIC ACIDS

Hans Fernholz, Bad Soden (Taunus), and Eberhard Mundlos and Otto Probst, Frankfurt am Main, Germany, assignors to Farbwerke Hoechst Aktiengesellschaft vormals Meister Lucius & Bruning, Frankfurt am Main, Germany, a corporation of Germany No Drawing. Application November 14, 1956
Serial No. 622,022

Claims priority, application Germany November 18, 1955

15 Claims. (Cl. 202—42)

This invention relates to a process for purifying carboxylic acids.

It is known that in chemistry the purification of carboxylic acids is often beset with difficulties; this applies especially to carboxylic acids which are sparingly soluble in water, distillable with water vapor or sublimable and which otherwise are frequently purified by recrystallization, water vapor distillation or sublimation. A water vapor distillation or a sublimation is, however, an uneconomical purification process, especially when used on an industrial scale and involves the disadvantage that the resulting acids are not always analytically pure.

A carboxylic acid which is especially difficult to purify is sorbic acid which exhibits a good preserving effect, for example, on easily perishable substances, and, therefore, becomes increasingly important. Sorbic acid produced in a known manner is generally obtained as a yellow to brownish crude product which can only difficultly be purified by conventional methods, for example, by recrystallization, sublimation or a water vapor distillation, which implies a considerable loss in sorbic acid. On the other hand, it is nearly impossible directly to distil the crude acid as a result of its instability.

It is known to purify or to separate by distillation coal tar into its ingredients, such as indole, diphenyl, cumarone, pseudo-cumene, phenanthrene or styrenes, with the use of glycols which are capable of forming azeotropic mixtures. Also dehydracetic acid has already been purified by distillation using glycols as entraining agent or carrier. As is known, dehydracetic acid is free from carboxylic groups and, therefore, is no carboxylic acid in a chemical sense.

Now we have found that true carboxylic acids which consist only of carboxylic groups, carbon and hydrogen and hence are free from functional groups or substituents carrying elements other than above described, can be easily purified by subjecting these acids to a distillation together with at least one glycol or a partially etherified glycol. It has been found and this being surprising that such distillation is not associated with an esterification provided that the distillation is performed with the application of not too high a temperature which, generally, does not exceed 180° C.

The process of this invention enables carboxylic acids which have hitherto been purified in a complicated way, for example by sublimation or a water vapor distillation, to be obtained in pure form. A mixture consisting of a commercial, crude, aromatic and mononuclear, monocarboxylic acid, such as benzoic acid or cinnamic acid, and a glycol or a glycol ether, i.e. a partially etherified glycol, when once distilled, yields a reliable product, provided the distillation is performed, preferably in vacuo under a pressure from 1–15 mm. of mercury, at a temperature below 180° C., preferably between about 110° C. and 180° C. and for example at 105–115° C. It is, however, also possible to operate at a temperature lower than indicated above, for example as low as 60° C., for example when the distillation is performed in a high vacuum. The lower limit of temperature naturally depends on the nature of the entraining agent and the acid used. The process described above enables also para-toluic acid obtained, for example, in addition to terephthalic acid, in the oxidation of para-xylene to be easily and practically quantitatively separated from terephthalic acid to produce pure para-toluic acid which otherwise can only be separated from said terephthalic acid by very complicated methods. By such distillation pure terephthalic acid is simultaneously obtained in the distillation residue; said acid may be further purified by recrystallizing it to remove still adhering impurities, if any.

In addition to the aforesaid aromatic carboxylic acids there may also be purified in the manner described aliphatic monocarboxylic acids, such as capronic acid, caprylic acid, capric acid, or unsaturated acids, for example with one or two double bonds, such as crotonic acid, dimethyl acrylic acid, or sorbic acid. Thus, surprisingly good results are obtained in the distillation of a mixture of sorbic acid/glycol or sorbic acid/glycol ether. Already a single distillation allows of producing analytically pure and colorless sorbic acid in a nearly quantitative yield.

As glycols or glycol ethers there may chiefly be used compounds whose boiling range is between 180° C. and 300° C. under normal pressure. There may be mentioned for example: Di- and/or tri-hydric alcohols including compounds, such as ethylene glycol, diethylene glycol, triethylene glycol, 1.3-propylene-glycol, 1.2-propylene glycol, the various butane diols, pentane diols, hexane diols, glycerin, trimethylol propane, hexane triol, tripropylene glycol, or the monoalkyl ethers thereof, for example methyl, ethyl- or propyl-ethers or mixtures of these compounds which may be obtained by subjecting several glycol molecules to a dehydration process.

In carrying out the distillation process of this invention it is advantageous to prepare mixtures which consist of 1–15, preferably 1–10 parts by weight of glycol and/or glycol ether per part by weight of carboxylic acid. The entraining agents used in the distillation preferably boil at a temperature which is up to about 40° C. lower or higher than that of the carboxylic acid to be purified.

The acids purified by the process of this invention may be worked up in a simple manner. Thus, for example, the distillate is mixed with water and the precipitated acid is filtered off with suction. The present invention is particularly advantageous since some of the aforesaid carboxylic acids, such as benzoic acid and sorbic acid, are used as food preservatives and, therefore, must be produced in an analytically pure form.

It has also been found that sorbic acid can be purified by distillation with particular advantage not only in the presence of glycols or monoalkyl glycol ethers, but also in the presence of any desired organic substance as carrier or entraining agent, which is distillable without decomposition under reduced or normal pressure, inert towards sorbic acid and boils at a temperature between 180° C. and 300° C. under normal pressure. As such organic substances there may be mentioned more especially: Hydrocarbons of aliphatic, cycloaliphatic or aromatic nature, such as petroleum fractions, dodecane, tetradecane, 5-methyldodecane, dodecene, dicyclohexyl, dicyclohexyl methane, para-di-tertiary-butyl benzene, tetrahydronaphthalene, 1- and 2-methyl naphthalene, 1-ethyl naphthalene, diphenyl naphthalene; halogenated aliphatic, cycloaliphatic or aromatic hydrocarbons, such as dichlorododecane, 1.5-dibromopentane, benzo-trichloride, ortho- and meta-dibromo-benzene; nitro compounds, such as nitro-benzene, 2-nitro-toluene; nitriles such as benzyl cyanide; carbonyl compounds, such as acetophenone, dehydro-carvone, or the heterocyclic 2-acetyl thiophene; heterocyclic compounds, such as chromane, thiophene; ethers, such as resorcine dimethyl ether, diphenyl ether, safrol, isosafrol; carboxylic acids, such as enanthic acid, alpha-ethyl-capronic acid, caprylic acid, capric acid; esters, such as succinic acid diethyl ester, glutaric acid diethyl ester, benzoic acid ethyl ester, phenyl acetic acid methyl ester, or salicylic acid methyl ester.

The process of this invention enables the production of a very pure sorbic acid which may be used as a preservative for easily perishable substances. Furthermore, the process herein described is an improvement in the known purification method in which only a crude sorbic acid is obtained which, generally, contains small amounts of mineral acids or organic sulfonic acid, the complete separation of which is complicated but necessary.

The process of this invention may also be carried out in the presence of carriers which are solid at room temperature, but it is advisable that sorbic acid is purified by distillation in the presence of substances which are liquid under normal conditions and separate pure sorbic acid upon cooling; the sorbic acid so produced is then isolated by filtration. The filtrate to which another quantity of sorbic acid still adheres is advantageously cycled and reused in a new distillation.

When sorbic acid is purified by distillation according to this invention it is advisable to prepare mixtures which consist of 1–15, preferably 1–10 parts by weight of carrier per part by weight of sorbic acid. A mixture containing less than 1 or more than 15 parts by weight of carrier may, however, also be used, although such mixture generally involves no special advantage. The carriers used in the distillation preferably boil between 210° C. and 270° C. under normal pressure. The distillation may be performed in vacuo or under normal pressure, it being of advantage to operate at a temperature not exceeding 270° C. It has proved especially favorable to perform the distillation at a temperature as applied in the presence of glycols or glycol mono-ethers, i.e. at a temperature below 180° C. and preferably under reduced pressure as specified above.

As a matter of fact the distillation may also be carried out under an excess pressure but such distillation conditions imply the use of a higher temperature. In order to remove the traces of the carrier adhering to the distilled and filtered sorbic acid, it is advisable to wash the sorbic acid crystals with an easily volatile solvent, such as petroleum ether, cyclohexane, or carbon tetrachloride in which sorbic acid is sparingly soluble, and then to dry the acid in a suitable manner.

The following examples serve to illustrate the invention, but they are not intended to limit it thereto:

*Example 1*

A mixture of 300 grams of diethylene glycol and 100 grams of commercial benzoic acid which contains about 10% of impurities is distilled under a pressure of 6 mm. of mercury. The distillate distills over at 110–120° C. and is then mixed with the same amount of water and cooled with ice water; the benzoic acid which has precipitated is filtered off with suction, washed with water and dried. The benzoic acid obtained is colorless, analytically pure and melts at 121° C. The yield is 87 grams.

*Example 2*

A mixture of 300 grams of triethylene glycol and 100 grams of commercial, brown cinnamic acid which contains about 15% of impurities is distilled under a pressure of 5 mm. of mercury. The distillate distills over at 130–135° C. and is then worked up as described in Example 1. A white and odorless cinnamic acid is obtained which melts at 134° C. The yield is 84 grams.

*Example 3*

A mixture of 300 grams of diethylene glycol and 100 grams of a 96% para-toluic acid is distilled at 110–112° C. under a pressure of 5 mm. of mercury. The distillate is then worked up as described in Example 1. The para-toluic acid obtained is analytically pure and melts at 179–180° C. The yield is 95 grams.

*Example 4*

A mixture of 300 grams of diethylene glycol, 40 grams of terephthalic acid and 60 grams of para-toluic acid is distilled as described in Example 3. The distillate yields 58 grams of pure para-toluic acid. The distillation residue carrying the terephthalic acid is recrystallized from diethylene glycol to yield 39 grams of pure terephthalic acid. Similar results are obtained with the use of various mixtures of terephthalic acid and para-toluic acid and triethylene glycol monomethyl ether.

*Example 5*

A mixture of 150 grams of diethylene glycol and 50 grams of a brown sorbic acid of about 80 percent strength is distilled under a pressure of 7 mm. of mercury. The distillate which distils over at a temperature between 120 and 125° C. is cooled to room temperature to obtain crystals of sorbic acid. The crystals so obtained are then filtered off with suction, washed with water and dried. The resulting sorbic acid is colorless and odorless and melts at 134° C. The yield is 30 grams. By the addition of the same quantity of water to the filtrate there may be obtained a further 8 grams of sorbic acid having the same degree of purity.

The filtrate (an about 7% solution of sorbic acid in diethylene glycol) may advantageously be used for further distillation purifications of crude sorbic acid.

*Example 6*

A mixture of 1000 grams of diethylene glycol and 1000 grams of a black tarry product which contains about 20% of sorbic acid is distilled and treated as described in Example 5. There are obtained 191 grams of an analytically pure sorbic acid which melts at 134° C.

*Example 7*

A mixture of 600 grams of a petroleum fraction boiling between 220° C. and 270° C. and 100 grams of crude sorbic acid which contains about 10% of impurities and about 1% of sulfuric acid, is distilled under a pressure of 20–30 mm. of mercury. The distillate distils over at 130–150° C. to separate upon cooling 87 grams of sorbic acid which is washed with petroleum ether. The sorbic acid obtained after drying is analytically pure, colorless and odorless and melts at 134–135° C.

*Example 8*

A mixture of 500 grams of tetradecane and 100 grams of the crude sorbic acid described in Example 7 is distilled under a pressure of 30 mm. of mercury. The distillate distils over at 140 to 150° C. to yield 88 grams of analytically pure sorbic acid.

*Example 9*

A mixture of 400 grams of diphenyl and 100 grams of the crude sorbic acid described in Example 7 is distilled at 145 to 150° C. under a pressure of 22 mm. of mercury. The distillate solidifies to give a crystalline magma from which the diphenyl is dissolved out with the use of cyclohexane. The sorbic acid obtained is colorless and melts at 134° C. The yield is 86 grams.

*Example 10*

A mixture of 300 grams of para-di-tertiary-butyl benzene and 100 grams of the crude sorbic acid described in Example 7 is distilled at 120° C. under a pressure of 20 mm. of mercury. The distillate which solidifies upon cooling to give a crystalline magma is then digested with cyclohexane. Analytically pure sorbic acid is obtained in a yield of 88 grams.

Example 11

A mixture of 400 grams of 1-methyl-naphthalene and 100 grams of the crude sorbic acid used in the preceding examples is distilled at 125° C. under a pressure of 20 mm. of mercury. The distillate is filtered and washed with petroleum ether to yield 88 grams of pure colorless sorbic acid.

Example 12

A mixture of 300 grams of resorcin dimethyl ether and 100 grams of the crude sorbic acid used in the preceding examples is distilled under normal pressure. The distillate which distils over at 210–215° C. is mixed with 100 cc. of carbon tetrachloride and then filtered off with suction. The distillate is then washed with carbon tetrachloride to yield 84 grams of an odorless and colorless sorbic acid which melts at 134° C.

Example 13

A mixture of 600 grams of 2-nitro-toluene and 150 grams of the crude sorbic acid used in the preceding examples which contains a small amount of sulfuric acid, is distilled at 200 to 230° C. under normal pressure. The distillate is mixed with 200 cc. of carbon tetrachloride and filtered. It is then washed with carbon tetrachloride to yield 132 grams of an odorless and colorless sorbic acid which melts at 134–135° C.

Example 14

A mixture of 400 grams of alpha-ethyl capronic acid and 100 grams of the crude sorbic acid used in the preceding examples is distilled at 110–115° C. under a pressure of 20 mm. of mercury. The distillate is suction filtered, washed with cyclohexane to yield 75 grams of analytically pure sorbic acid. By the addition of 200 grams of cyclohexane to the filtrate there may be obtained a further 10 grams of sorbic acid.

Example 15

A mixture of 500 grams of glutaric acid diethyl ester and 130 grams of the crude sorbic acid used in the preceding examples is distilled at about 130° C. under a pressure of 20 mm. of mercury. 200 cc. of cyclohexane are then added to the distillate to yield 105 grams of analytically pure sorbic acid.

Example 16

A mixture of 600 grams of ortho-dibromo-benzene and 140 grams of the crude sorbic acid described in the preceding examples is distilled at 105–110° C. under a pressure of 15–20 mm. of mercury. 300 grams of carbon tetrachloride are then added to the distillate to obtain 112 grams of pure sorbic acid which melts at 134° C.

We claim:

1. A process for purifying a monocarboxylic acid consisting of a carboxylic acid group, carbon and hydrogen, containing at least 4 carbon atoms and having low volatility, which comprises co-distilling said acid with an entrainer selected from the group consisting of dihydric alcohols, trihydric alcohols and mono-alkyl-ethers thereof, the alkyl group of said ethers having from 1 to 3 carbon atoms.

2. A process for the purification of a monocarboxylic acid consisting of a carboxylic acid group, carbon and hydrogen, containing at least 4 carbon atoms and having low volatility, which comprises co-distilling said acid with an entrainer boiling under atmospheric pressure at a temperature in the range from 180 to 300° C. and being selected from the group consisting of dihydric alcohols, trihydric alcohols and mono-alkyl-ethers thereof, the alkyl group of said ethers having from 1 to 3 carbon atoms.

3. A process according to claim 2, wherein the dihydric alcohol used is an ether of at least 2 glycol molecules.

4. A process for purifying a monocarboxylic acid consisting of a carboxylic acid group, carbon and hydrogen, containing at least 4 carbon atoms and having low volatility, which comprises co-distilling said acid with an entrainer selected from the group consisting of dihydric alcohols, trihydric alcohols and mono-alkyl-ethers thereof, the alkyl group of said ethers having from 1 to 3 carbon atoms, the entrainer being applied in an amount of from 1 to 10 parts by weight per part by weight of carboxylic acid to be purified.

5. A process for purifying a monocarboxylic acid consisting of a carboxylic acid group, carbon and hydrogen, containing at least 4 carbon atoms and having low volatility, which comprises co-distilling said acid under reduced pressure and at a temperature below about 180° C. with an entrainer selected from the group consisting of dihydric alcohols, trihydric alcohols and mono-alkyl-ethers thereof, the alkyl groups of said ethers having from 1 to 3 carbon atoms.

6. A process for the purification of a monocarboxylic acid consisting of a carboxylic acid group, carbon and hydrogen, containing at least 4 carbon atoms and having low volatility, which comprises co-distilling said acid under reduced pressure and at a temperature in the range from about 110° to about 180° C. with an entrainer selected from the group consisting of dihydric alcohols, trihydric alcohols and mono-alkyl-ethers thereof, the alkyl group of said ethers having from 1 to 3 carbon atoms, the entrainer being applied in an amount of from 1 to 15 parts by weight per part by weight of carboxylic acid to be purified.

7. A process for the separation of a mixture of para-toluic acid and terephthalic acid which comprises co-distilling the para-toluic acid from said acid mixtures with at least one compound selected from the group consisting of dihydric alcohols, trihydric alcohols and mono-alkyl-ethers thereof, the alkyl group of said ethers having from 1 to 3 carbon atoms, and isolating the terephthalic acid from the remaining residue after the toluic acid has been distilled.

8. A process for the purification of sorbic acid which comprises co-distilling said acid with a hydrocarbon inert to sorbic acid and boiling without decomposition under normal pressure at a temperature in the range from 210–270° C.

9. A process for the purification of sorbic acid which comprises co-distilling said acid with a hydrocarbon inert to sorbic acid and boiling without decomposition under normal pressure at a temperature in the range from 180 to 300° C., the amount of said added hydrocarbon being in the range from 1 to 15 parts by weight per part by weight of sorbic acid.

10. A process for the purification of sorbic acid which comprises co-distilling said acid under reduced pressure and at a temperature below about 180° C. with an entrainer boiling under atmospheric pressure at a temperature in the range from 180 to 300° C. and being selected from the group consisting of dihydric alcohols, trihydric alcohols and mono-alkyl-ethers thereof, the alkyl group of said ethers having from 1 to 3 carbon atoms, the entrainer being applied in an amount of from 1 to 15 parts by weight per part by weight of carboxylic acid to be purified.

11. A process for the purification of sorbic acid which comprises co-distilling said acid with at least one hydrocarbon being inert to sorbic acid, liquid at room temperature and boiling without decomposition under normal pressure at a temperature in the range from 180 to 300° C.

12. A process for the purification of sorbic acid which comprises co-distilling said acid at a temperature below about 270° C. with a hydrocarbon liquid at room temperature and under atmospheric pressure and being inert to sorbic acid and boiling without decomposition under normal pressure at a temperature in the range from 180 to 300° C., the amount of said added hydrocarbon being in the range from 1 to 15 parts by weight per part by weight of sorbic acid.

13. A process for the purification of sorbic acid which comprises co-distilling said acid at a temperature in the range from about 110 to about 180° C. under reduced pressure with a hydrocarbon liquid at room temperature and under atmospheric pressure and being inert to sorbic acid and boiling without decomposition under normal pressure at a temperature in the range from 180 to 300° C.

14. A process for the purification of a monocarboxylic acid consisting of a carboxylic acid group, carbon and hydrogen, containing at least 4 carbon atoms and having low volatility, which comprises co-distilling said acid in an azeotropic distillation with an entrainer boiling under atmospheric pressure at a temperature in the range from 180 to 300° C. and being selected from the group consisting of dihydric alcohols, trihydric alcohols and monoalkyl ethers thereof, the alkyl group of said ethers having from one to three carbon atoms, the boiling points of the carboxylic acid and the entrainer differing from each other by up to about 40° C.

15. A process for the purification of sorbic acid which comprises codistilling said acid with an entrainer selected grom the group consisting of hydrocarbons, monocarboxylic acids, mononitro derivatives of hydrocarbons, and ethers that are inert to sorbic acid, liquid at room temperature and under normal atmospheric pressure, and boil without decomposition under normal pressure at a temperature in the range of from 180 to 300° C.

References Cited in the file of this patent
UNITED STATES PATENTS

| | | |
|---|---|---|
| 2,325,379 | Durrum | July 27, 1943 |
| 2,455,803 | Pierotti | Dec. 7, 1948 |
| 2,553,992 | Wiggins | May 22, 1951 |
| 2,651,604 | Hartley | Sept. 8, 1953 |

FOREIGN PATENTS

| | | |
|---|---|---|
| 431,313 | Great Britain | July 4, 1935 |

OTHER REFERENCES

Perry: "Chemical Engineers Handbook," page 652 (1950).